No. 747,151. PATENTED DEC. 15, 1903.
F. A. DIXON.
STEAM COOKER.
APPLICATION FILED FEB. 19, 1903.
NO MODEL.
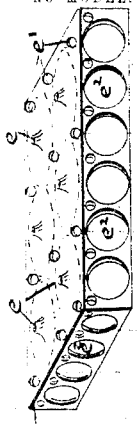
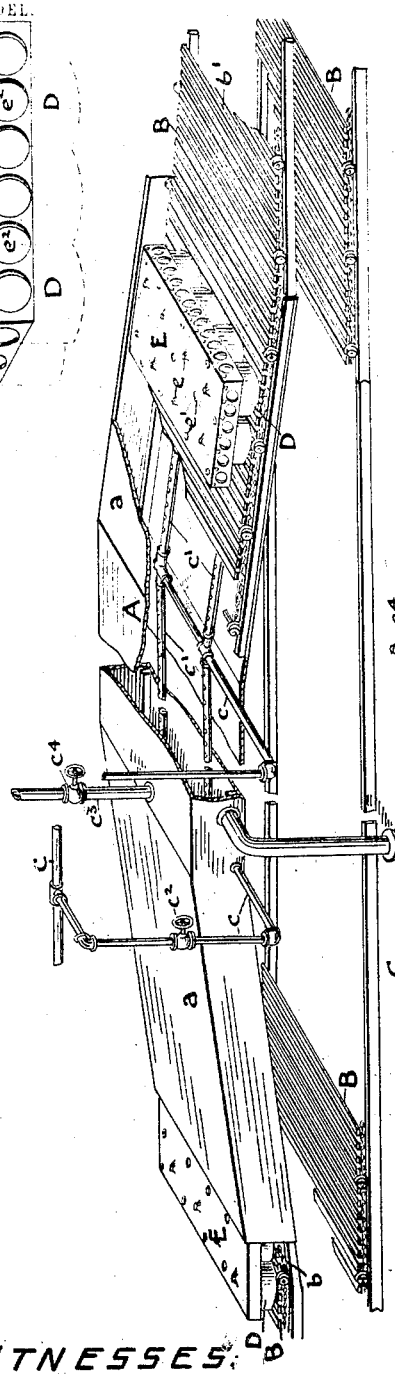
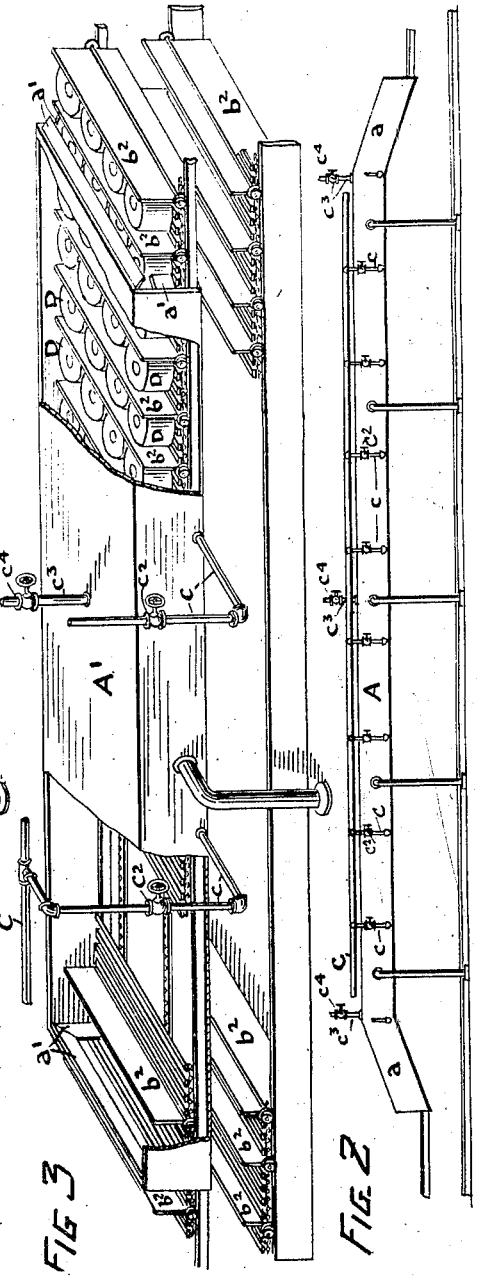
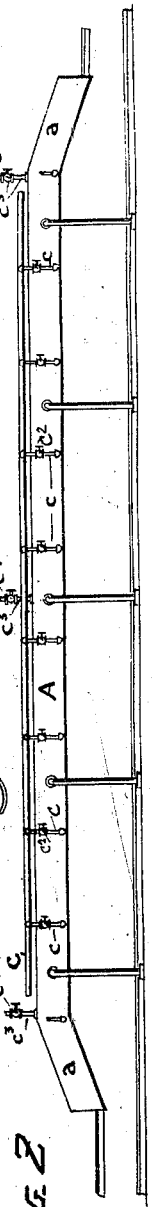
WITNESSES:
Walter F. Vane.
D. B. Richards
INVENTOR:
Frank A. Dixon
by Wm. F. Booth
his attorney.

No. 747,151.

Patented December 15, 1903.

UNITED STATES PATENT OFFICE.

FRANK A. DIXON, OF SAN JOSE, CALIFORNIA.

STEAM-COOKER.

SPECIFICATION forming part of Letters Patent No. 747,151, dated December 15, 1903.

Application filed February 19, 1903. Serial No. 144,039. (No model.)

*To all whom it may concern:*

Be it known that I, FRANK A. DIXON, a citizen of the United States, residing at San Jose, county of Santa Clara, State of California, have invented certain new and useful Improvements in Steam-Cookers; and I do hereby declare the following to be a full, clear, and exact description of the same.

My invention relates to the class of devices and apparatus for cooking or "processing" fruit.

One object of my invention is to provide a steam-cooker through which the travel of the fruit may be continuous.

Another object is to provide for the proper control of the heat in the cooker.

A third object is to provide suitable means in connection with a steam-cooker for protecting the fruit from injurious direct contact with the steam and yet giving to said fruit sufficient heat to cook it and such free exposure in its containing vessels as will avoid undue pressure therein by freely driving off the gases prior to permanent capping, whereby the resultant fruit is clearer and better.

The types of cookers in use for processing fruit may be broadly divided into two.

First, those in which water is used, which water may be heated by steam or otherwise. In these cookers, because there is no difficulty in confining the water in the vessel, the process of cooking is continuous. An endless carrier enters the water at one end of the cooker and emerges at the other end, conveying the fruit-filled cans through the water.

Second, those in which steam is used to do the cooking directly. In this type, on account of having to confine the steam, the cooker is a closed vessel, into which batches of fruit-filled cans are introduced at intervals, closed in, and after the cooking is complete removed. In this type, although the prior and subsequent steps of the processing may be continuous, this advantageous operation stops at the cooker, where the fruit must be handled in batches.

To avoid the disadvantages of these types of cookers, by securing a continuous operation in a steam-cooker, which is my first object, my invention consists in a steam-supplied open-ended box, a carrier passing continuously through said box, and means for retaining the steam in said box sufficiently to maintain the required temperature to cook the continuously-moving fruit passing through the steam.

Again, in the type of water-cookers wherein the cans move continuously through the water there is no way to vary the time of cooking except by varying the speed of the carrier, which of course is not always desirable, nor is there any way of quickly suspending the operation in case of a breakdown. In view of these considerations, to secure my second object my invention consists, in connection with my steam-cooker, of such an arrangement of separately-controllable and thoroughly-distributed steam inlets and exhausts as will enable me to vary the time of cooking without altering the speed of the carrier and to suspend operations immediately in case of a breakdown or for any other reason. Finally, it is the custom to cap the filled cans before passing them through the cooker. This practice, which is required by the necessity of protecting the fruit from the heat medium, has a double disadvantage, to wit: First, the can is so full of fruit at first that the capping is difficult and uncertain, and, second, the closed can induces a pressure within it and retains gases during cooking which do not result in as clear or good a product as desired. In this regard and to secure my third object my invention consists, in connection with a cooker in which steam alone is used, of a temporary and partial cap applied to the otherwise-uncapped cans and of such a nature that while protecting the fruit from the direct contact of the steam will yet avoid internal pressure and permit the escape of the gases, while supplying the necessary heat for cooking.

Referring to the accompanying drawings, Figure 1 is a perspective view, enlarged and partly broken, of my steam-cooker. Fig. 2 is a side view, on a reduced scale, of the same. Fig. 3 is a perspective view of a modification of the cooker, but embodying the same principle of continuous operation. Fig. 4 is a perspective view showing the application of my temporary cap to a group of cans.

Referring to Figs. 1 and 2, A is a box forming the steam-chamber. This box is straight and horizontal for the greater portion of its length. Its ends $a$ have a downward inclination and are open.

B is a slatted endless carrier of suitable construction. It starts from a suitable point and proceeds horizontally, forming the supply-platform $b$, thence it passes up the entrance-inclined end $a$ of the steam-box, along the floor thereof, and thence through said box and down and out the other end $a$ and forms the discharge-platform $b'$. Thence it returns under the box to the point of beginning.

C is the steam-supply pipe, which descends outside the box in branches C at intervals, said branches entering the box under the carrier and each being provided inside the box with perforated delivery-pipes $c'$, set close enough together throughout the interior to perfectly distribute the steam. Each branch $c$ exterior to the box is provided with a controlling-cock $c^2$.

D represents the cans, supported by the carrier and adapted to be progressed through the steam chamber or box A. Exhausts $c^3$ issue at intervals from the top of the box, and each is controlled by a cock $c^4$.

E in Fig. 4 is the temporary cap. This consists of a downwardly-flanged plate preferably made large enough to embrace a group of cans, as shown. This plate rests on top of the cans, while its flanges embrace them. The plate is provided with perforated cones $e$, each lying above the open top of an uncapped can. The plate has also in its top and flanges small holes $e'$, which lie opposite the intercan spaces, and the flanges are further made with large holes $e^2$ to make them as open as possible.

A temporary cap, such as E, is placed over a group of uncapped but filled cans on the supply end $b$ of the carrier B, as shown in Fig. 1, just before entering the cooker. It continues with the group through the cooker, as is shown in said figure in the advanced group therein exposed through the broken box. The effect of this cap is to prevent the direct contact of the steam with the fruit; but by reason of its loose-fitting perforated construction it permits free enough circulation of the heat to cook the fruit, yet leaves the cans open enough to permit the escape of the gases and to avoid internal pressure. When the cans emerge from the cooker, the cap E is simply lifted off, and the level of the fruit has been lowered so much in cooking that their is no difficulty in then capping the cans, and the fruit itself is clearer and better. The inner walls of the cones $e$ direct the condensations away from the uncapped openings in the cans, and the holes $e'$ if punched from within, so as to make their borders concave, better discharge the condensations outwardly.

No trays are needed for the cans. They rest on the slatted carrier, from which they may easily be taken off or discharged in any manner, the temporary cap E serving to segregate them in groups.

The feature of the form of the cooker shown in Figs. 1 and 2 is the downwardly-inclined ends, which result in the somewhat elevated middle of the box. These ends block or trap the box sufficiently to retain the steam, which tending to rise by its own heat is further held up by atmospheric pressure at the depressed ends. Consequently a degree of heat necessary for cooking can easily be reached and maintained in the elevated major portion of the box, and yet the ends are open to receive the continuously entering and leaving cans.

The arrangement and distribution of the separately-controllable steam-discharges in the box in connection with the separately-controllable exhausts therefrom, it will be readily seen, provides for varying the time of cooking as may be required without having to vary the speed of the carrier. For example, suppose it be desired to cook the fruit only for, say, one-half the full time. The required number of steam branches $c$ at the first portion of the box are cut off, so that no steam enters that portion, while steam still enters the last portion. The exhausts $c^3$ at the first portion of the box are at the same time opened, while those at the last portion are kept closed. There will, therefore, be little, if any, steam in the first part of the box, but the required amount in the last part, and thus the fruit will be subjected to the cooking process only in the latter part. In like manner any portion of the box may be thrown into or out of use for cooking, as may be desired, and in all cases without having to change the speed of the carrier, and, further, the control of the box in whole and in part, as just described, may take place at any time without having to wait for any particular batch of fruit to get through. Moreover, in case of a breakdown or from any cause which requires an immediate suspension of the operation the process can be at once suspended by cutting off the steam and opening the exhausts.

I do not confine myself as far as the principle of blocking the ends of the box is concerned to the form of box of Figs. 1 and 2, which show the inclined ends. Thus in Fig. 3 I have shown another means of effecting the same result. In this case the box represented by A' is horizontal throughout. The carrier B is provided with flights or valves $b^2$ at intervals, which somewhat closely, though not fully, fill the interior space of box A', the end joints being rendered a little closer, if desired, by means of valve-flaps $a'$ on the box ends engaging with each flight $b^2$ as it enters and leaves the box. These flights $b^2$ serve to block the box ends sufficiently to confine the steam and keep it at the required temperature.

Having thus described my invention, what I claim as new, and desire to secure by Letters Patent, is—

1. A steam-cooker comprising a box, means for supplying steam thereto, a traveling carrier passing through said box, and adapted to continuously convey material through the steam in said box, and depending open-ended portions on said box for retaining the steam in the box to maintain the required temperature therein.

2. A steam-cooker comprising a box, steam-pipes entering and discharging steam into said box at intervals throughout its length, means for separately controlling said steam-pipes to admit or cut off the steam from portions thereof as desired, a traveling carrier passing through said box, and adapted to continuously convey the material through the steam in said box, and depending open-ended portions on said box for retaining the steam in the box to maintain the required temperature therein.

3. A steam cooker comprising a box, having downwardly-inclined open-ended extremities, means for supplying steam to said box, and a traveling carrier passing through the box, into and out of its inclined extremities, and adapted to continuously convey the fruit through the steam in said box.

4. A steam-cooker comprising a box having downwardly-inclined open-ended extremities, steam-pipes entering said box at intervals throughout its length, means for separately controlling said steam-pipes to admit or cut off the steam from portions of the box as desired, and a traveling carrier passing through the box, into and out of its inclined extremities and adapted to continuously convey the fruit through the steam in said box.

5. A steam-cooker comprising a box having downwardly-inclined open-ended extremities, steam-pipes entering said box at intervals throughout its length, means for separately controlling said steam-pipes to admit or cut off the steam from portions of the box as desired, separately-controllable exhausts from different portions of the box, and a traveling carrier passing through the box, into and out of its inclined extremities and adapted to continuously convey the fruit through the steam in said box.

6. In a steam-cooker in which the fruit is contained and exposed in vessels to the steam, a temporary cap fitted over the open vessels to protect their contents from the steam, said cap being provided with perforations communicating with the open tops of the vessels, and supplemental perforations adjacent the sides thereof to permit free circulation of the heat and the escape of the gases.

7. In a steam-cooker in which the fruit is contained and exposed in vessels to the steam, a temporary cap fitted over the open vessels, said cap being provided with apertured cones lying over the openings of the vessels, and perforations adjacent the sides of the vessels, whereby the fruit is protected from the steam while the circulation of heat and the escape of the gases are permitted.

8. In a steam-cooker in which the fruit is contained and exposed in vessels to the steam, a temporary cap fitted over the open vessels, said cap consisting of a plate having apertured cones lying over the openings in said vessels, and downwardly-extending flanges embracing the vessels, both plate and flanges being perforated to permit circulation of heat and escape of gases, while protecting the fruit from contact of the steam.

9. A steam-cooker comprising a box, means for supplying steam thereto, a traveling carrier passing through said box, vessels in which the material is contained and exposed mounted on said carrier, a temporary cap fitted over the open vessels to protect their contents from the steam, while permitting free circulation of the heat and the escape of the gases, the said carrier adapted to continuously convey the material through the steam in said box, and depending open-ended portions on said box for retaining the steam therein to maintain the required temperature.

In witness whereof I have hereunto set my hand.

FRANK A. DIXON.

Witnesses:
WALTER F. VANE,
D. B. RICHARDS.